United States Patent [19]

Iseman

[11] Patent Number: 4,817,461
[45] Date of Patent: Apr. 4, 1989

[54] DUAL GENERATOR PHASE SHIFTING DEVICE

[75] Inventor: Walter J. Iseman, Monroe Center, Ill.

[73] Assignee: Sundstrand Corporation, Rockford, Ill.

[21] Appl. No.: 104,809

[22] Filed: Oct. 5, 1987

[51] Int. Cl.⁴ .............................................. F16H 47/00
[52] U.S. Cl. ...................................... 74/720; 310/112; 310/114
[58] Field of Search .......................... 310/112, 114, 83; 74/686, 681, 714, 720, 803

[56] References Cited

U.S. PATENT DOCUMENTS

| | | | |
|---|---|---|---|
| 3,535,572 | 10/1970 | Rugeris | 310/168 |
| 3,586,938 | 6/1971 | Le Gall | 318/166 |
| 4,031,421 | 6/1977 | Geiger | 310/112 |
| 4,373,147 | 2/1983 | Carlson, Jr. | 318/48 |
| 4,525,655 | 6/1985 | Walker | 310/112 X |
| 4,609,842 | 9/1986 | Aleem et al. | 310/114 X |
| 4,654,577 | 3/1987 | Howard | 310/114 X |
| 4,728,841 | 3/1988 | Sugden | 310/114 |

FOREIGN PATENT DOCUMENTS 532252 12/1929 Fed. Rep. of Germany .
1921626 4/1969 Fed. Rep. of Germany .
2007310 4/1969 France .
53377 6/1967 Poland .

*Primary Examiner*—Dirk Wright
*Attorney, Agent, or Firm*—Wood, Dalton, Phillips, Mason & Rowe

[57] ABSTRACT

In order to effect a phase shift in a dual generator having a pair of rotor-supporting shafts, where the phase shift accommodates optimum performance characteristics in a device requiring minimal space therewithin, the phase shifting device includes a first gear associated with an end of one rotor-supporting shaft and a second gear associated with an end of the other rotor-supporting shaft. The ends of the rotor-supporting shafts and disposed in spaced adjacent relation and the first rotor-supporting shaft is drivingly interconnected to the second rotor-supporting shaft through the first and second gears which are drivingly interconnected by a planet gear. With the planet gear mounted on a motor, the motor can be locked to maintain a selected phase relationship between first and second generators defining the dual generator to directly transmit rotational movement of one of the rotor-supporting shafts to the other of the rotor-supporting shafts and the motor can be activated to cause a shift in the relative position of the one rotor-supporting shaft relative to the other rotor-supporting shaft to effect a phase shift between the first and second generators on command.

16 Claims, 1 Drawing Sheet

DUAL GENERATOR PHASE SHIFTING DEVICE

FIELD OF THE INVENTION

The present invention relates to phase shifting devices and, more particularly, to a phase shifting device for a dual generator having drivingly interconnected rotor-supporting shafts.

BACKGROUND OF THE INVENTION

For some applications, a pair of generators are connected in series to form a dual generator. This is done, for instance, where a maximum output voltage is required during certain periods of operation while a minimum output voltage is required at other times. For instance, it is not uncommon to require a maximum output voltage at the outset of an operation.

In such cases, two permanent magnet generators in series electrically can be utilized to accommodate the differences in required output voltage. This can be accomplished by controlling the phase of one of the two generators relative to the other generator to thereby control the output. Unfortunately, there has been no entirely satisfactory phase shifting device for this purpose.

Of course, one rotor-supporting shaft can be manually shifted relative to the other rotor-supporting shaft to accomplish the required phase shift. Depending upon the actual construction of the dual permanent magnet generator, however, this may require substantial time and effort or, perhaps, may not even be possible without reconstructing the generator particularly where the generator is designed for and normally operated in a selected phase relationship. Moreover, even with phase shifting devices specifically designed for dual permanent generators, the devices are generally oversized and less than entirely satisfactory.

While not specifically addressing the problems overcome by the present invention, Geiger U.S. Pat. No. 4,031,421, issued June 21, 1977, is directed to an electric generator. Also, LeGall U.S. Pat. No. 3,586,938, issued June 22, 1971, is directed to a phase-sensitive servomotor, DeRugeris U.S. Pat. No. 3,535,572, issued October 20, 1970 is directed to an alternator having rotatable magnetic field and armature structures, and Carlson U.S. Pat. No. 4,373,147, issued Feb. 8, 1983 is directed to a torque compensated electric motor, However, no one has successfully provided a phase shifting device for a dual permanent magnet generator having rotor-supporting shafts in drivingly interconnected relation.

The present invention is directed to overcoming the above stated problems and accomplishing the stated objects by providing such a phase shifting device.

SUMMARY OF THE INVENTION

Accordingly, the present invention is directed to a phase shifting device comprising first gear means associated with an end of a first rotor-supporting shaft and second gear means associated with an end of a second rotor-supporting shaft. The end of the first rotor-supporting shaft is disposed in spaced adjacent relation to the end of the second rotor-supporting shaft, and means are provided for drivingly interconnecting the first rotor-supporting shaft to the second rotor-supporting shaft through the first and second gear means. The interconnecting means cooperates with the first and second gear means to maintain a selected phase relationship between first and second generators defining a dual permanent magnet generator by directly transmitting rotational movement of one of the first and second rotor-supporting shafts to the other of the first and second rotor-supporting shafts such that the first and second rotor-supporting shafts rotate at the same speed. The first and second gear means are adapted to cooperate with the interconnecting means to effect a phase shift between the first and second generators on command. Accordingly, the phase shifting device is well suited for a dual generator having rotor-supporting shafts in drivingly interconnected relation.

In an exemplary embodiment, the phase-shifting device includes a first cavity in the end of the first rotor-supporting shaft and a second cavity in the end of the second rotor-supporting shaft. Also, the first rotor-supporting shaft is preferably generally coaxial with the second rotor-supporting shaft. Further, the first gear means is preferably a first internal ring gear in the first cavity and the second gear means is preferably a second internal ring gear in the second cavity.

With such construction, the interconnecting means advantageously includes a planet gear having a first gear segment in engagement with the first internal ring gear and a second gear segment in engagement with the second internal ring gear. Still further, the interconnecting means also advantageously includes means for driving the first internal ring gear through the first gear segment while simultaneously driving the second internal ring gear through the second gear segment. By reason of the cooperation of the first gear segment with the first internal ring gear and the second gear segment with the second internal ring gear, the interconnecting means comprises a single element planetary differential.

In the preferred embodiment, the driving means includes a hydraulic vane motor having an eccentric shaft. The planet gear is then mounted on the eccentric shaft of the hydraulic vane motor with the first and second gear segments in engagement with the first and second internal ring gears, respectively. Further, the hydraulic vane motor is adapted to be maintained in a selected position to drivingly interconnect the first and second rotor-supporting shafts Preferably, the first rotor-supporting shaft comprises a driving shaft and the second rotor-supporting shaft comprises a driven shaft. The hydraulic vane motor is then mounted within the second cavity in the end of the driven shaft. Moreover, the eccentric shaft of the hydraulic vane motor extends from the second cavity in the end of the driven shaft into the first cavity in the end of the driving shaft.

Still additional details of the preferred embodiment include the second rotor-supporting shaft having an axial passageway extending therethrough. The axial passageway advantageously extends from the source of fluid under pressure to the hydraulic vane motor for supplying the hydraulic vane motor with fluid at a selected pressure which is a function of the torque being transmitted. Preferably, the selected pressure in the hydraulic vane motor causes the driven shaft to rotate with the driving shaft in the selected phase relationship.

With these features, the planet gear mounted on the eccentric shaft of the hydraulic vane motor is rotated responsive to a change in the selected fluid pressure. The first gear segment and first internal ring gear are then preferably related to the second gear segment and second internal ring gear such that rotation of the planet gear causes a shift in the relative angular positions of the first and second rotor-supporting shafts. As a result of the change in the selected fluid pressure, a phase shift is caused between the first and second generators.

Preferably, a control means meters flow to or away from the hydraulic vane motor. Then, a steady state is achieved when the flow being metered to the hydraulic vane motor is equal to its leakage.

Still additional details of the present invention include the first gear segment and first internal ring gear having a different gear ratio than the second gear segment and the second internal ring gear. The different gear ratios then cause the shift in the relative angular positions of the first and second rotor-supporting shafts when the planet gear is rotated and, accordingly, the phase shift is effected by the shift in the relative angular positions of the first and second rotor-supporting shafts caused by the different gear ratios. Additionally, the phase shifting device advantageously includes stop means associated with the driving and driven shafts for limiting the amount of the shift in the relative angular positions of the driving and driven shafts.

Other objects, advantages and features of the present invention will become apparent from a consideration of the following specification taken in conjunction with the accompanying drawings.

BRIEF DESCRIPTION OF THE DRAWINGS

FIG. 2 is a cross-sectional view taken on the line 2—2 of FIG. 1; a

DETAILED DESCRIPTION OF THE PREFERRED EMBODIMENT

Figure 1:
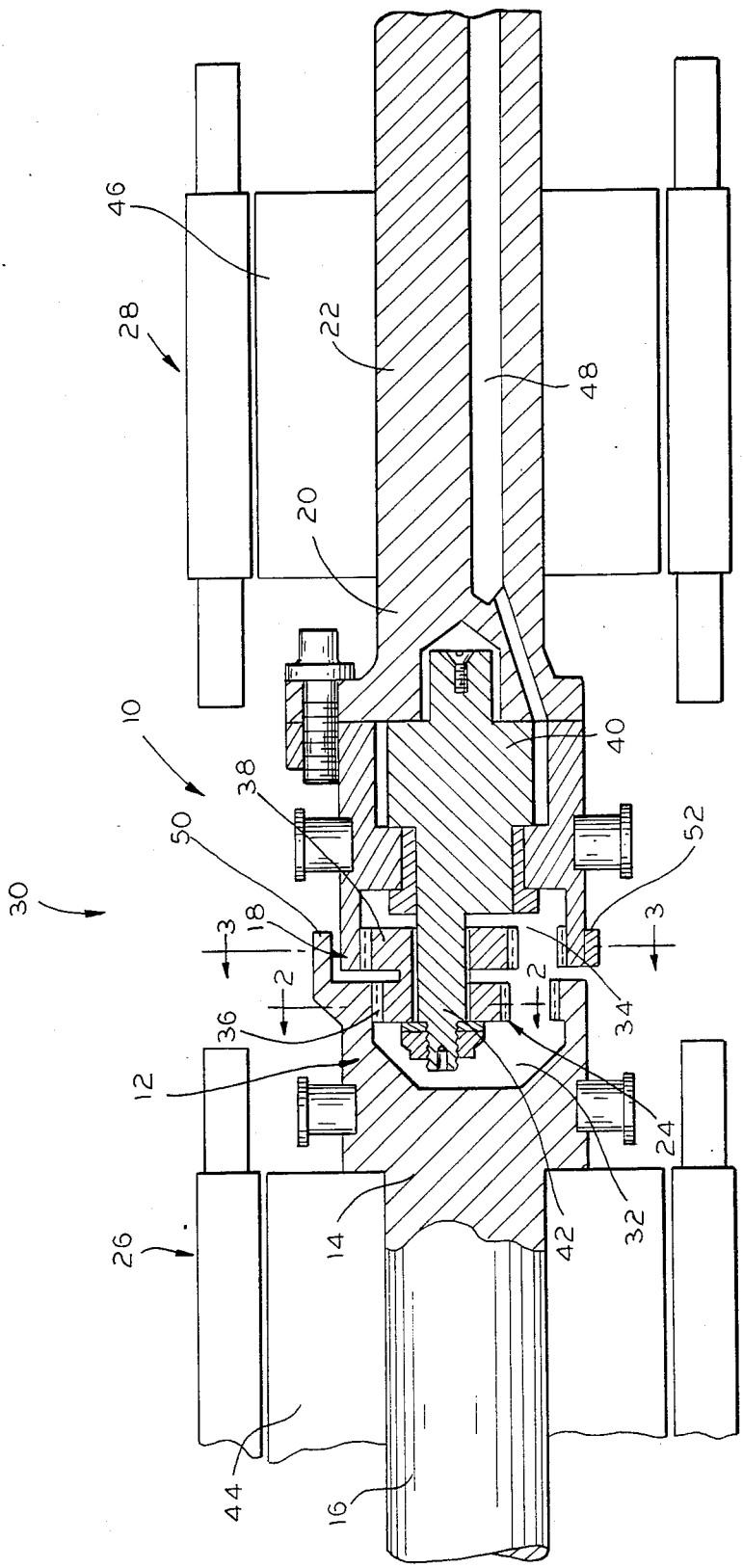
FIG. 1 is a cross-sectional view illustrating a phase shifting device in accordance with the present invention.

An exemplary embodiment of a phase shifting device for a dual permanent magnet generator having rotor-supporting shafts in drivingly interconnnected relation is illustrated in FIG. 1. The phase shifting device 10 includes first gear means 12 associated with an end 14 of a first rotor-supporting shaft 16 and second gear means 18 associated with an end 20 of a second rotor-supporting shaft 22. The end 14 of the first rotor-supporting shaft 16 is disposed in spaced adjacent relation to the end 20 of the second rotor-supporting shaft 22, and means such as the planet gear generally designated 24 is provided for drivingly interconnecting the first rotor-supporting shaft 16 to the second rotor-supporting shaft 22 through the first and second gear means 12 and 18, respectively. The planet gear 24 cooperates with the first and second gear means 12 and 18 to maintain a selected phase relationship between first and second generators 26 and 28 defining a dual permanent magnet generator generally designated 30 by directly transmitting rotational movement of one of the first and second rotor-supporting shafts such as 16 to the other of the first and second rotor-supporting shafts such as 22. While the first and second rotor-supporting shafts 16 and 22 normally rotate at the same speed, the planet gear 24 is adapted to cooperate with the first and second gear means 12 and 18 to effect a phase shift between the first and second generators 26 and 28, as will be described in detail hereinafter.

Still referring to FIG. 1, the phase shifting device 10 includes a first cavity 32 in the end 14 of the first rotor-supporting shaft 16 and a second cavity 34 in the end 20 of the second rotor-supporting shaft 22. The first rotor-supporting shaft 16, as shown, is generally coaxial with the second rotor-supporting shaft 22. Further, the first gear means 12 is preferably a first internal ring gear in the first cavity 32 and the second gear means 18 is preferably a second internal ring gear in the second cavity 34.

Referring to the planet gear 24, it includes a first gear segment 36 in engagement with the first internal ring gear 12 and a second gear segment 38 in engagement with the second internal ring gear 18 Moreover, the interconnecting means preferably includes not only the planet gear 24 but also means such as a hydraulic vane motor 40 for driving the planet gear 24 which is mounted thereon. With this arrangement, the hydraulic vane motor 40 is able to drive the first internal ring gear 12 through the first gear segment 36 while simultaneously driving the second internal ring gear 18 through the second gear segment 38.

As clearly shown in FIG. 1, the hydraulic vane motor 40 comprising the driving means has an eccentric shaft 42. The planet gear 24, as previously mentioned, is mounted on the hydraulic vane motor 40 and, in particular, on the eccentric shaft 42 such that the first and second gear segments 36 and 38 are in engagement with the first and second internal ring gears 12 and 18, respectively. Additionally, the hydraulic vane motor 40 is adapted to be maintained in a selected position to drivingly interconnect the first and second rotor-supporting shafts 16 and 22.

As shown, the first rotor-supporting shaft 16 carries a rotor 44 and comprises a driving shaft and the second rotor-supporting shaft 22 carries a rotor 46 and comprises a driven shaft. The hydraulic vane motor 40 is mounted within the second cavity 34 in the end 20 of the driven shaft 22. Still more particularly, the eccentric shaft 42 of the hydraulic vane motor 40 extends from the second cavity 34 in the end 20 of the driven shaft 22 into the first cavity 32 in the end 14 of the driving shaft 16.

Still referring to FIG. 1, the second rotor-supporting shaft 22 includes an axial passageway 48 extending from a source of fluid under pressure to the hydraulic vane motor 40. The axial passageway 48 is thereby adapted to supply the hydraulic vane motor 40 with fluid at a selected pressure which is a function of the torque being maintained. As previously suggested, the selected pressure in the hydraulic vane motor 40 causes the driven shaft 22 to rotate with the driving shaft 16 in the selected phase relationship.

Figure 3:
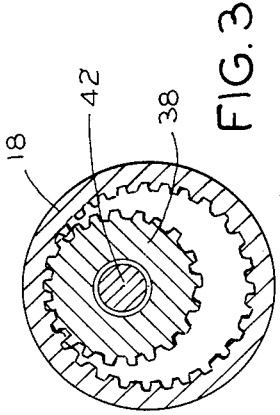
FIG. 3 is a cross-sectional view taken on the line 3—3 of FIG. 1.
Figure 2:
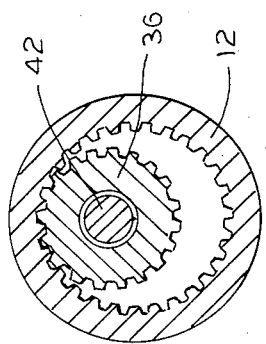

With the features as described, the planet gear 24 mounted on the eccentric shaft 42 of the hydraulic vane motor 40 is rotated responsive to a change in the selected fluid pressure. The first gear segment 36 and the first internal ring gear 12 (see also FIG. 2) are related to the second gear segment 38 and second internal ring gear 18 (see also FIG. 3) such that rotation of the planet gear 24 causes a shift in the relative angular positions of the first and second rotor-supporting shafts 16 and 22. As will be appreciated, the change in the selected fluid pressure thereby causes a phase shift between the first and second generators 26 and 28.

Still more particularly, the first gear segment 36 and first internal ring gear 12 have a different gear ratio than the second gear segment 38 and the second internal ring gear 18. The different gear ratios will cause the shift in the relative angular positions of the first and second rotor-supporting shafts 16 ad 22 when the planet gear 24 is rotated. In this connection, the phase shift is effected by the shift in the relative angular positions of the first and second rotor-supporting shafts 16 and 22 caused by the different gear ratios described herein.

In the preferred embodiment, stop means is associated with the driving and driven shafts 16 and 22. Preferably, this takes the form of an axially extending finger 50 associated with the end 14 of the shaft 16 and a radially extending projection 52 associated with the end 20 of the shaft 22 where the finger 50 and the projection 52 are disposed such that one will contact the other when the relative angular position between the shafts 16 and 22 have reached a desired limit. More specifically, this will occur to limit the amount of the shift in the relative angular positions of the shafts 16 and 22.

Referring to FIG. 1, it will be seen that the first cavity 32 is disposed in closely spaced adjacent relation to the second cavity 34. This view also makes it clear that the first rotor-supporting shaft 16 is generally coaxial with and axially spaced from the second rotor-supporting shaft 22. Moreover, by comparing FIGS. 1 through 3, it is clear that the planet gear 24 is able to directly transmit rotational movement of the first rotor-supporting shaft 16 to the second rotor-supporting shaft 22.

In addition, the planet gear 24 is formed such that the first gear segment 36 is integral with the second gear segment 38 for simultaneous movement to accommodate simultaneously driving the first and second internal ring gears 12 and 18. With different gear ratios, this will cause the relative angular movement between the first and second rotor-supporting shafts 16 and 22. Moreover, with the planet gear 24 mounted on the eccentric shaft 42 of the hydraulic vane motor 40 in conventional fashion, the hydraulic vane motor 40 can be maintained at a selected fluid pressure so as to directly transmit rotational movement of the shaft 16 to the shaft 22.

As mentioned above, the hydraulic vane motor 40 is driven to drive the planet gear 24 in response to variations in fluid pressure from a source of fluid under pressure (not shown). Thus, if the phase relationship between the first 28 is such that the output voltage is at a maximum, the fluid pressure from the source through the axial passageway 48 to the hydraulic vane motor 40 may be increased or decreased depending upon the operating characteristics of the hydraulic vane motor 40 to "unlock" the hydraulic vane motor 40 to thereby cause the planet gear 24 to rotate whereby a shift in the relative angular positions of the first and second rotor-supporting shafts 16 and 22 is caused. With a shift in the relative angular positions of the first and second rotor-supporting shafts 16 and 22, a phase shift is effected between the first and second generators 26 and 28 to cause the output voltage to be reduced to a desired level.

While not specifically shown, the increase or decrease in fluid pressure in the axial passageway 48 can be controlled in a conventional manner by metering flow to or away from the hydraulic vane motor 40. As a result, the phase shift can be effected on command from any controller with a steady state once again being achieved when flow metered to the hydraulic vane motor 40 is equal to its leakage. Clearly, the phase shifting device 10 accomplishes the objective of providing a compact and effective way of effecting a phase shift between first and second generators of a dual permanent magnet generator 30.

While in the foregoing there has been set forth a preferred embodiment of the invention, it will be understood that the details herein given may be varied by those skilled in the art without departing from the spirit and scope of the appended claims.

I claim:

1. A phase shifting device for a dual PM generator having a first rotor-supporting shaft in drivingly interconnected relation to a second rotor-supporting shaft, comprising:

first gear means associated with an end of said first rotor-supporting shaft and second gear means associated with an end of said second rotor-supporting shaft, said end of said first rotor-supporting shaft being disposed in spaced adjacent relation to said end of said second rotor-supporting shaft; and means for drivingly interconnecting said end of said first rotor-supporting shaft to said end of said second rotor-supporting shaft through said first and second gear means, and interconnecting means cooperating with said first and second gear means between said ends of said first and second rotor-supporting shafts to maintain a selected phase relationship between first and second generators defining said dual generator by directly transmitting rotational movement of one of said first and second rotor-supporting shaft such that said first and second rotor-supporting shafts normally rotate at the same speed, said interconnecting means being adapted to cooperate with said first and second gear means to selectively effect a phase shift between said first and second generators on command.

2. The phase shifting device as defined by claim 1 including a first cavity in said end of said first rotor-supporting shaft and a second cavity in said end of said second rotor-supporting shaft, said first rotor-supporting shaft being generally coaxial with said second rotor-supporting shaft, said first gear means being a first internal ring gear in said first cavity and said second gear means being a second internal ring gear in said second cavity.

3. The phase shifting device as defined by claim 2 wherein said interconnecting means includes a planet gear having a first gear segment in engagement with said first internal ring gear and a second gear segment in engagement with said second internal ring gear, said interconnecting means also including means for driving said first internal ring gear through said first gear segment while simultaneously driving said second internal ring gear through said second gear segment.

4. The phase shifting device as defined by claim 3 wherein said driving means includes a hydraulic vane motor having an eccentric shaft, said planet gear being mounted on said eccentric shaft with said first and second gear segments in engagement with said first and second internal ring gears, respectively, said hydraulic vane motor being adapted to be maintained in a selected position to drivingly interconnect said first and second rotor-supporting shafts.

5. The phase shifting device as defined by claim 4 wherein said first rotor-supporting shaft comprises a driving shaft and said second rotor-supporting shaft comprises a driven shaft, said hydraulic vane motor being mounted within said second cavity in said end of said driven shaft, said eccentric shaft of said hydraulic vane motor extending from said second cavity in said end of said driven shaft into said first cavity in said end of said driving shaft.

6. The phase shifting device as defined by claim 5 wherein said second rotor-supporting shaft includes an axial passageway extending therethrough, said axial passageway extending from a source of fluid under pressure to said hydraulic vane motor for supplying said hydraulic vane motor with fluid at a selected pressure, said selected pressure locking said hydraulic vane motor to cause said driven shaft to rotate with said driving shaft in said selected phase relationship.

7. The phase shifting device as defined by claim 6 wherein said planet gear mounted on said eccentric shaft of said hydraulic vane motor is rotated responsive to a change in said selected fluid pressure, said first gear segment and first internal ring gear being related to said second gear segment and second internal ring gear such that rotation of said planet gear causes a shift in the relative angular positions of said first and second rotor-supporting shaft, said change in said selected fluid pressure thereby causing a phase shift between said first and second generators.

8. The phase shifting device as defined by claim 7 wherein said first gear segment and first internal ring have a different gear ratio than said second gear segment and second internal ring gear, said different gear ratios causing said shift in the relative angular positions of said first and second rotor-supporting shafts when said planet gear is rotated, said phase shift being effected by said shift in the relative angular positions of said first and second rotor-supporting shafts caused by different gear ratios.

9. The phase shifting device as defined by claim 8 including stop means associated with said driving and driven shafts for limiting the amount of said shift in the relative angular positions of said driving and driven shafts.

10. A phase-shifting device for a dual generator having a first rotor-supporting shaft drivingly interconnected to a second rotor-supporting shaft comprising:
    first gear means associated with an end of said first rotor-supporting shaft and second gear means associated with an end of said second rotor-supporting shaft, said end of said first rotor-supporting shaft having a first cavity therein and said end of said second rotor-supporting shaft having a second cavity therein with said first cavity disposed in closely spaced adjacent relation to said second cavity, said first rotor-supporting shaft being generally coaxial with and axially spaced from said second rotor-supporting shaft;
    said first gear means being a first internal ring gear in said first cavity and said second gear means being a second internal ring gear in said second cavity;
    a planet gear for drivingly interconnecting said first rotor-supporting shaft to said second rotor-supporting shaft, said planet gear having a first gear segment in engagement with said first internal ring gear and a second gear segment in engagement with said second internal ring gear, said planet gear directly transmitting rotational movement of said first rotor-supporting shaft to said second rotor-supporting shaft;
    means for driving said first internal ring gear through said first gear segment while simultaneously driving said second internal ring gear through said second gear segment, said driving means also being adapted to cooperate with said planet gear to maintain a selected phase relationship between first and second generators defining said dual generator by maintaining said first and second rotor-supporting shafts in a selected position of relative angular adjustment through said first and second internal ring gears, said driving means also being adapted to cooperate with said planet gear to effect a phase shift between said first and second generators on command.

11. The phase shifting device as defined by claim 10 wherein said driving means includes a hydraulic vane motor having an eccentric shaft, said planet gear being mounted on said eccentric shaft with said first and second gear segments in engagement with said first and second internal ring gears, respectively, said hydraulic vane motor being adapted to be maintained in a selected position to drivingly interconnect said first and second rotor-supporting shafts.

12. The phase shifting device as defined by claim 10 wherein said first rotor-supporting shaft comprises a driving shaft and said second rotor-supporting shaft comprises a driven shaft, said driving means being disposed within said second cavity in said end of said driven shaft, said driving means having an eccentric shaft extending from said second cavity in said end of said driven shaft into said first cavity in said end of said driving shaft.

13. The phase shifting device as defined by claim 10 wherein said second rotor-supporting shaft includes an axial passageway extending therethrough, said axial passageway extending from a source of fluid under pressure to said driving means, said driving means comprising a hydraulic vane motor, said axial passageway thereby being adapted to supply said hydraulic vane motor with fluid at a selected pressure, said selected fluid pressure locking said hydraulic vane motor to cause said second rotor-supporting shaft to rotate with said first rotor-supporting shaft in said selected phase relationship.

14. The phase shifting device as defined by claim 10 wherein said planet gear is mounted on an eccentric shaft of a hydraulic vane motor comprising said driving means, said hydraulic vane motor being driven to drive said planet gear in response to variations in fluid pressure from a source of fluid under pressure and in communication with said hydraulic vane motor, said planet gear being related to said first and second internal ring gears such that rotation of said planet gear causes a shift in the relative angular positions of said first and second rotor-supporting shafts.

15. The phase shifting device as defined by claim 10 wherein said first gear segment and first internal ring gear have a different gear ratio than said second gear segment and second internal ring gear, said different gear ratios causing a shift in the relative angular positions of said first and second rotor-supporting shafts when said planet gear is rotated, said phase shift being effected by said shift in the relative angular positions of said first and second rotor-supporting shafts caused by said different gear ratios.

16. The phase shifting device as defined by claim 15 including stop means associated with said first and second rotor-supporting shafts for limiting the amount of said shift in the relative angular positions of said first and second rotor-supporting shafts.

* * * * *